(12) United States Patent
Cardwell et al.

(10) Patent No.: US 6,895,403 B2
(45) Date of Patent: May 17, 2005

(54) METHOD AND SOFTWARE FOR IDENTIFYING AND CREATING CONNECTIONS AND ACCOUNTABILITY IN A BUSINESS ORGANIZATION

(76) Inventors: James Cardwell, 5343 Park Dr., Vermilion, OH (US) 44089; Karla P. Norwood Cardwell, 5343 Park Dr., Vermilion, OH (US) 44089

( * ) Notice: Subject to any disclaimer, the term of this patent is extended or adjusted under 35 U.S.C. 154(b) by 277 days.

(21) Appl. No.: 09/818,011

(22) Filed: Mar. 27, 2001

(65) Prior Publication Data

US 2002/0055864 A1 May 9, 2002

Related U.S. Application Data

(60) Provisional application No. 60/194,070, filed on Mar. 31, 2000.

(51) Int. Cl.[7] .............................................. G06F 17/30
(52) U.S. Cl. ................ 707/10; 707/2; 707/6; 707/8; 707/102; 707/104; 707/201; 707/204; 703/2
(58) Field of Search .............................. 707/2, 6, 8, 10, 707/102, 104, 201, 204; 703/2; 705/12, 34; 718/101; 709/227, 229; 706/45; 379/265.05

(56) References Cited

U.S. PATENT DOCUMENTS

| | | | |
|---|---|---|---|
| 5,974,392 A | 10/1999 | Endo | 705/8 |
| 6,016,486 A | 1/2000 | Nichols | 706/47 |
| 6,023,572 A | 2/2000 | Lautzenheiser et al. | 395/500.23 |
| 6,282,573 B1 * | 8/2001 | Darago et al. | 709/229 |
| 6,377,992 B1 * | 4/2002 | Plaza Fernandez et al. | 709/227 |
| 6,466,935 B1 * | 10/2002 | Stuart | 707/10 |
| 6,487,545 B1 * | 11/2002 | Wical | 706/45 |
| 6,519,642 B1 * | 2/2003 | Olsen et al. | 709/227 |
| 6,636,599 B1 * | 10/2003 | Mullen | 379/265.05 |
| 6,742,015 B1 * | 5/2004 | Bowman-Amuah | 718/101 |
| 2002/0103695 A1 * | 8/2002 | Urken et al. | 705/12 |
| 2002/0103731 A1 * | 8/2002 | Barnard et al. | 705/34 |

OTHER PUBLICATIONS

Goetsch, "A Research Study to Establish the Need to Implement Cycle Time Reduction Strategies for New Package Introductions", IEEE, 1993, pp. 309–316.*

Lotus Development Corporation website Hyperion Allocation Manager website.

* cited by examiner

Primary Examiner—Thuy N. Pardo
(74) Attorney, Agent, or Firm—Brouse McDowell; Roger D. Emerson; Daniel A. Thomson (57) ABSTRACT

A new and improved method for identifying and creating connections and accountability in a business organization is described herein. The inventive method allows individuals to view all the different levels of the organization so that they can be aware of how their task fits into the overall goal of the organization.

14 Claims, 3 Drawing Sheets

Organization Connection connections online

- View Another Organization
- View/Edit Dialog
- New Dialog
- Delete Dialog
- Focus
- Organization Connection
- Organization Dialog Agenda
- Organization Tree

Tabs: My connection | Organization connection | Team connection | Individual connection

ABC Financial Institution—20% Market share in Garfield County, with 40% household Profitability! QCXS Values, Integrity focus

Purpose: Help customers achieve their financial dreams.

BHAG: 20% Market Share in Garfield County, with 40% household profitability!

Emotional Goal: 20/40 by 2006 by helping dreams come true!

business priorities current

1. Headquarters Renovation — 08/03/2004
2. E-Branch — 10/15/2004
3. Relationship Pricing System — 02/15/2004
4. Expense Reduction — 01/31/2004
5. Outdated systems and processes — 08/03/2004 critical measures

| | current | minimum | meets | exceeds |
|---|---|---|---|---|
| 1. Financial Performance results | | | | |
| 1. Monthly Net income per employee | 1 mil | 3 mil | 4 mil | 5 mil |
| 2. Asset Growth | $1.9 bil | $1.2 bil | $1.4 bil | $1.7 bil |
| 2. Preferred financial institution | current | minimum | meets | exceeds |
| 1. Market segment Penetration | 86% | 80% | 90% | 95% |
| 2. Loans per customer | $6553 | $6550 | $6650 | $6700 |
| 3. Operations | current | minimum | meets | exceeds |
| 1. Functional errors-back office per month | 5 | 5 | 3 | 1 |
| 4. Employees | current | minimum | meets | exceeds |
| 1. Satisfaction survey | 55% | 500% | 70% | 80% |

FIG-1

Team Connection connections online

View Another Team
View/Edit Dialog
New Dialog
Delete Dialog

Team Connection
Team Dialog Agenda
Business Priority Team
Authority Matrix

| | |
|---|---|
| Executive Hours: | 53 |
| Staff Hours: | 310 |
| Change in Expense: | $1,000,000.00 |
| Change in Revenue: | $0.00 |

---

My connection | Organization connection | Team connection | Individual connection

ABC Financial Institution-20% Market share in Garfield County, with 40% household Profitability!
1. Headquarters Renovation [Pat Conroy]

scope

1. Mark is team leader
2. Plan, develop and co-ordinate an efficient space plan program to meet the demands of our employees and customers.

evaluation criteria

1. Project completed on time and within budget team members

| | |
|---|---|
| John Akers | |
| Pat Conroy | |
| Mark Haines | |
| Bill Smith | | deliverables

| Description | Exec | Staff | Due Date |
|---|---|---|---|
| Obtain approval by city for plan[Pat Conroy, Mark Haines, Bill Smith] | 20 | 10 | 05/21/2001 |
| this is a new deliverable too | 0 | 0 | |
| ~~Plan the space[Mark Haines, Bill Smith]~~ | ~~24~~ | ~~120~~ | ~~04/15/2001~~ |
| Develop plan for work flow and "Image"[Mark Haines] | 5 | 138 | 05/05/2001 |
| Conduct feasibility study of future space requirements [John Akers, Mark Haines, Bill Smith] | 4 | 42 | 06/01/2001 |

FIG-2

Individual Connection connections online

- View Another Individual
- View/Edit Dialog
- New Dialog
- Delete Dialog

- Individual Connection
- Dialog Agenda
- Authority Matrix
- Organization Dialog
- Function Department
- Projects Next Dialog 04/09/2001

---

| My connection | Organization connection | Team connection | Individual connection |

ABC Financial Institution-20% Market share in Garfield County, with 40% household Profitability!

Mark Haines, CFO basic role
35% Balance Sheet Management and Strategy
  1. Retail Strategy Committee Decisions
  2. A/LM Strategies
35% Income and Expense Management
  1. Budget Variance Results
  2. Resource Allocation Planning/Implementation
20% Operational Management business priorities
1. Headquarters Renovation — 08/03/2001
   Plan the space[Mark Haines, Bill Smith] — 04/15/2001
   Develop plan for work flow and "image"[Mark Haines] — 05/05/2001
   Obtain approval by city for plan [Pat Conroy, Bill Smith, Mark] — 05/21/2001 function/department projects: finances
1. Develop ALCO matrix — 10/01/2001
   sdfasdf — 03/01/2001
   date 2 — 04/01/2001
   date 1 — 05/01/2001
2. New Finance application installed overall accountability
1. Reinforcing the vision and achieving the strategic goals within my functional areas of responsibility.
2. Providing accurate and timely functional reports and analysis to provide the overall accountability
1. Information technology (data processing, MIS, project management, payment services
2. Collectors (loan collections asset liquidation, fraud authority matrix
Level authorities: Senior Vice President
Budget and Contracting
Human Resources
Policies and Procedures

FIG-3

METHOD AND SOFTWARE FOR IDENTIFYING AND CREATING CONNECTIONS AND ACCOUNTABILITY IN A BUSINESS ORGANIZATION

This application claims priority to U.S. Provisional Patent Application Ser. No. 60/194,070, entitled METHOD AND SOFTWARE FOR IDENTIFYING AND CREATING CONNECTIONS AND ACCOUNTABILITY IN A BUSINESS ORGANIZATION, filed on Mar. 31, 2000.

BACKGROUND OF THE INVENTION

A. Field of the Invention

This invention relates to the art of consulting and business management, and more particularly to interconnecting the business strategies at different levels of a business, and even more particularly to interconnecting, evaluating, and analyzing each individual's work contributions and work linkages within the business.

B. Description of the Related Art

Every business wants to do their job as quickly as possible, especially in today's fast-paced society. The executives at each organization respond to this pressure in different ways. The result is lack of clarity and a lack of confidence about how to complete the job. The larger organizations have a difficult time acting quickly on anything because of this lack of clarity, as well as the numerous channels that everything must pass through for a decision to be made. Oftentimes, different parts of the organization do not know what the others are doing, and every inconsistent message passed down from upper management is magnified as it is interpreted down through the organization. Organizations need a more evolved nervous system to connect the parts (i.e. employees) and to provide strategic understanding and direction. The present invention alleviates these problems by creating a way for an organization to have all of its parts interconnected and aware of what the other parts are doing.

In order to deliver business results, information technology providers must understand a client's business strategy and goals. Therefore, management consulting skills are as important as infrastructure and architecture skills. In one known consulting process by Lotus, the process includes enterprise knowledge management, electronic communities and markets, value chain innovation, enterprise process innovation, workflow and messaging based solutions, and messaging migration and coexistence. This process, however is used to ensure repeatable, quantifiable results on large-scale projects. The Lotus process does not allow each level of the business organization to be coherently integrated like the present invention. The Lotus process consists simply of discrete documents used in the organization of filing models.

Another business consulting system is Hyperion's Strategic Planning Session, which is a series of steps focused on analyzing current and future business needs. It is designed for a organization that has experienced change since its original implementation —through reorganization, acquisition, staff turnover, or redefined financial structures. The key deliverable of the session is a strategic plan that focuses on short and long term requirements and recommendations. A formal report is prepared and presented during an on-site follow up meeting. However, Hyperion's process does not interrelate and coordinate employees and tasks at different levels of the organization as does the present invention.

Many organizations and businesses use products and services like the ones offered by Lotus and Hyperion. However, the present invention enables an organization to aggregate, coordinate, and organize the information contained within these products and services, as well as the products and services themselves.

The present invention provides a new and improved method for creating connections and accountability in a business, and overcomes certain difficulties inherent in the related inventions while providing better overall results.

SUMMARY OF THE INVENTION

In accordance with the present invention, a method for interconnecting multiple sections of an organization includes the steps of providing multiple layers of an organization, creating a data table, the data table containing at least one objective of the organization, at least one goal of the organization, and priority levels for the at least one objective, providing means for analyzing the at least one objective, providing means for organizing multiple objectives, creating at least one team project based on the at least one objective, assigning at least one task based on the at least one team project, assigning priority levels to the at least one objective, the at least one team project, and the at least one task, allowing access between the layers, and providing means for comparing the at least one objective, the at least one team project, and the at least one task.

In accordance with another aspect of the present invention, a method for organizing a business entity includes the steps of creating a first informational database, the first informational database containing at least one business objective of the business entity, creating a second informational database, the second informational database containing at least one project based on the at least one business objective, and allowing open access to and between the first and second informational databases.

In accordance with yet another aspect of the present invention, the method includes the steps of editing at least one of the informational databases, creating a second informational database, creating at least one project based on the at least one objective, determining organizational priorities, assigning a priority value to the at least one objective, assigning a priority value to the at least one project, creating a third informational database, creating at least one task based on the at least one project, and allowing open access to and between the first, second, and third informational databases, allowing limited access to the first and second informational databases.

In accordance with still another aspect of the present invention, the method includes the steps of allowing limited access between the first, second, and third informational databases, providing security measures for limiting access to the informational databases, editing at least one of the informational databases, updating at least one of the informational databases, developing critical measures associated with the first informational database, developing evaluation criteria and deliverables for the second informational database, and developing basic roles for the third informational database.

In accordance with the present invention, an apparatus for organizing a business entity includes means for creating a first informational database, the first informational database containing at least one business objective of the business entity, means for creating a second informational database, the second informational database containing at least one project based on the at least one business objective, and means for allowing open access to and between the first and second informational databases.

In accordance with yet another aspect of the present invention, the apparatus includes means for editing at least one of the informational databases, means for creating a second informational database, means for creating at least one project based on the at least one objective, means for determining organizational priorities, means for assigning a priority value to the at least one objective, means for assigning a priority value to the at least one project, means for creating a third informational database, means for creating at least one task based on the at least one project, means for allowing open access to and between the first, second, and third informational databases, and means for allowing limited access to the first and second informational databases.

In accordance with still another aspect of the present invention, the apparatus includes means for allowing limited access between the first, second, and third informational databases, means for providing security measures for limiting access to the informational databases, means for editing at least one of the informational databases, means for updating at least one of the informational databases, means for developing critical measures associated with the first informational database, means for developing evaluation criteria and deliverables for the second informational database, and means for developing basic roles for the third informational database.

In accordance with another aspect of the present invention, a computer readable medium containing instructions for controlling a computer system to perform a method, the method includes the steps of creating a first informational database, the first informational database containing at least one business objective of the business entity, creating a second informational database, the second informational database containing at least one project based on the at least one business objective, and allowing open access to and between the first and second informational databases.

In accordance with yet another aspect of the present invention, the computer readable medium containing instructions for controlling a computer system to perform a method, the method includes the steps of editing at least one of the informational databases, creating a second informational database, creating at least one project based on the at least one objective, determining organizational priorities, assigning a priority value to the at least one objective, assigning a priority value to the at least one project, creating a third informational database, creating at least one task based on the at least one project, and allowing open access to and between the first, second, and third informational databases, allowing limited access to the first and second informational databases.

In accordance with still another aspect of the present invention, the computer readable medium containing instructions for controlling a computer system to perform a method, the method includes the steps of allowing limited access between the first, second, and third informational databases, providing security measures for limiting access to the informational databases, editing at least one of the informational databases, updating at least one of the informational databases, developing critical measures associated with the first informational database, developing evaluation criteria and deliverables for the second informational database, and developing basic roles for the third informational database.

BRIEF DESCRIPTION OF THE DRAWINGS

FIG. 3 is a screen shot of the individual part of the inventive process.

DESCRIPTION OF THE EMBODIMENTS

The present invention begins with a meeting of the upper management of an organization to determine the direction taken by the organization. Example A shows one way of implementing the first portion of this embodiment of the invention.

EXAMPLE A

Focus ☐
Purpose: Help customers achieve their financial dreams.
BHAG: 20% Market Share in Garfield County, with 40% household profitability!
Emotional Goal: 20/40 by 2006 by helping dreams come true!

Strategy: (the unique and sustainable way we will create value)
    community branding
    through customer intimacy Focus can also be used as way to Business Priorities: Current ☐☐☐

| | |
|---|---|
| 1.Headquarters Renovation | 08/03/2001 |
| 2.E-Branch | 10/15/2001 |
| 3.Relationship Pricing System | 02/15/2001 |
| 4.Expense reduction | 01/31/2001 |
| 5.Outdated systems and processes | 12/31/2001 |

-continued communicate with all system users on an as needed basis. The Focus box has an unlimited capacity.
Critical Measures ☐☐☐
new category
new critical measure

| | Current | Minimum | Meets | Exceeds |
|---|---|---|---|---|
| 1.Financial Performance results | Current | Minimum | Meets | Exceeds |
| 1.Monthly Net Income per Employee | 1 mil | 3 mil | 4 mil | 5 mil |
| 2.Asset Growth | $1.9 bil | $1.2 bil | $1.4 bil | $1.7 bil |
| 2.Preferred Financial Institution | Current | Minimum | Meets | Exceeds |
| 1.Market segment Penetration | 86% | 80% | 90% | 95% |
| 2.Loans per Customer | $6553 | $6550 | $6650 | $6700 |
| 3.Operations | Current | Minimum | Meets | Exceeds |
| 1.Functional Errors-back office per month | 5 | 5 | 3 | 1 |
| 4.Employees | Current | Minimum | Meets | Exceeds |
| 1.Satisfaction Survey | 55% | 500% | 70% | 80% |

This Organization Connection™, wherein the upper management of the organization determines the future of the organization, begins with what focus does the organization want to have. The focus is a summary outline of the business purpose and strategy for the organization. In order to aid in the determination of the focus, the inventive process provides suggestions such as determining the purpose, economic goals, emotional goals (generally a short, measurable statement that creates a common perspective throughout the organization about what the business is trying to accomplish), core values (generally a consensus on how the business will be run), and a strategy. The purpose of the organization or the upcoming term will revolve around why does the organization exist or do what it does. Fleshing out the purpose of an organization will help the executives determine what the goals and priorities should be. The system allows each of these to be clearly laid out and organized.

The creation of a focus for the upcoming year, or whatever term the management is discussing will aid the management and executives in creating tasks for their employees. This top level of the system can be divided into as many pieces as necessary (i.e. one for accounting, one for the intellectual property department, etc.) or it can start as one piece and have divergent pieces from there.

Once the focus has been determined, along with the purpose, goals, and strategy for the upcoming term, the business priorities can be set. In this embodiment, the business priorities are an agreed upon priority listing of each project/goal that merits organizational resource allocation, and cross-discipline attention (by "cross-discipline" it is meant interaction between different parts of the organization, such as accounting and engineering). Each business priority is a brief statement that explains the purpose of the team. A team will be set up for each business priority to allocate resources to the particular business priority. In this Example the four categories of business priority are as follows: 1) Current (requires immediate resources and attention); 2) Queued (considered "on hold" until resources are available from Current priorities); Completed (tasks associated with priority have been completed); and 4) Dropped (priority has been dropped due to adjustment of strategy, lack of resources, etc.) It is to be understood, however, that any number or type of category can be used, as long as chosen using sound business judgment.

In determining the focus and the business priorities, the inventive process has the executives discuss the scope of the projects (i.e. what is included and what is not included). Generally, the scope of a project is not discussed or determined until it has "trickled" down through the organization to the actual employee performing the work. The determination of scope at the upper management level will allow the organization to operate more efficiently, as well as give the upper management an idea of the workload of their employees.

Once the executives have determined the business priorities, which teams should carry out these priorities, and what priority category each should go into, the critical measures are determined. The critical measures are a list of a few critical performance measure targets that need to be achieved for the short and long term success of the organization. Each of the measures can have subcategories as well. Each measure or submeasure is tracked, showing the expectation and the progress of the organization. This way, the executives can quickly and accurately track key issues of the organization without the need to call lengthy meetings or conducting surveys of the organization. Again, it is to be understood that the specific set up of the critical measures shown in Example A is for illustrative purposes only, and is not intended to limit the invention in any manner.

At this upper management level, the executives can also create teams and team leaders to organize and direct each of the business priorities. The scope, authority, and limits to each priority can be set and determined by the upper management. The inventive system allows upper management to create a detailed and concrete business plan for the organization that can be efficiently carried out. It is to be understood that the inventive process allows the upper management to have as little or as much input and control as required.

EXAMPLE B

ABC Financial Institution—20% Market Share in Garfield County, with 40% Household Profitability!

| 1.-Headquarters Renovation [Pat Conroy] | | |
|---|---|---|
| Scope ▭<br><br>1. Mark is the team leader<br>   Plan, develop and co-ordinate an<br>   efficient space plan program to<br>2. meet the demands of our employees<br>   and customers | Evaluation Criteria ▭<br><br>Project completed<br>1. on time and within budget | Team Member ▭<br><br>John Akers<br>Pat Conroy<br>Mark<br>Haines<br>Bill Smith |

Deliverables ▭ new deliverable
new task

| | Description | Exec. | Staf. | Due Date | |
|---|---|---|---|---|---|
| ! | Obtain approval by city for plan [Pat Conroy, Mark Haines, Bill Smith] | 20 | 10 | 05/21/2001 | ⊙ |
| . | This is a new deliverable too | 0 | 0 | | |
| • | ~~Plan the space [Mark Haines, Bill Smith]~~ | ~~24~~ | ~~120~~ | ~~04/15/2001~~ | |
| • | Develop plan for work flow and "image" [Mark Haines] | 5 | 138 | 05/05/2001 | ⊙ |
| • | Conduct feasibility study of future space requirements [John Akers, Mark Haines, Bill Smith] | 4 | 42 | 06/01/2001 | </TH<br>TR> |

Figure 2:
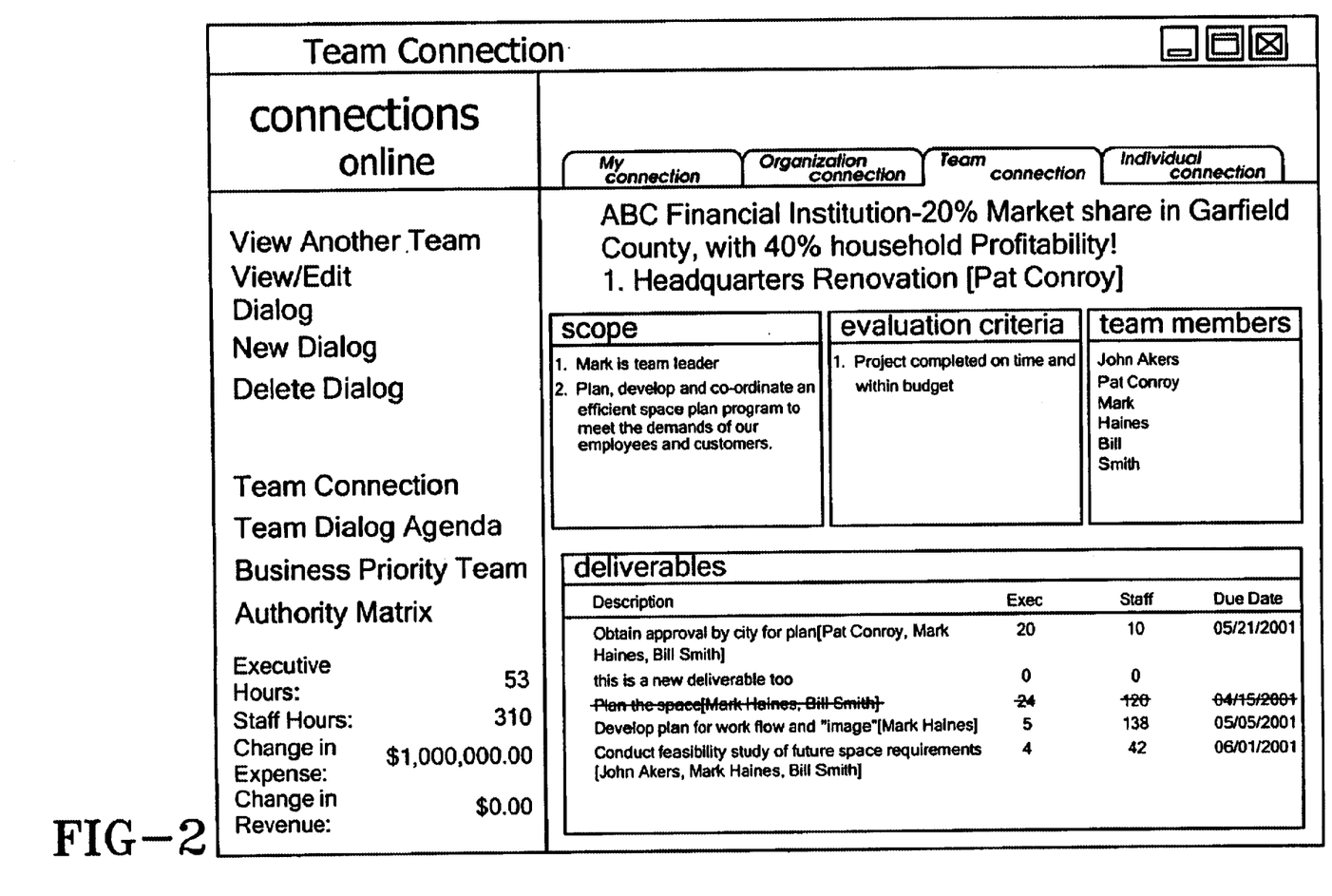
FIG. 2 is a screen shot of the team part of the inventive process.

Example B shows the next level down, the Team Connection™. This level provides for effectively leading cross-discipline teams to complete the organizational business priorities. This embodiment has a team contract, which helps clearly chart the team and focus the team's work and deliverables. The deliverables are a chronological listing of the specific outcomes the team will produce as it completes each portion of the project.

In this embodiment, each team will address a particular business priority. It is to be understood, however, that, if desired, one team could be responsible for more than one business priority. The business priority is shown at the top of the Team Connection™ page. The priority is broken up into scope, evaluation criteria, team members, and authority. In the scope section, the intended scope of the project is shown. The scope will describe what the end product should be (i.e. research report, presentation, analysis report, development plan, etc.) The evaluation criteria gives an explanation of how the priority will be evaluated (i.e. when employee will know it's done, how will the employee know whether it was successful or not, etc.) The team members are the employees working on the business priority. The team members may be scattered throughout the organization, but the inventive process allows them to all be connected to each other, and all be aware of what the others are doing within the scope of the project. The authority level describes what each team member is responsible for, and how much authority they have.

The deliverables are tangible results achieved during performance of the project. For example, calling ten people is a tangible result. The deliverables can be updated and edited so that all levels of the organization can be aware of what is transpiring on a particular priority. As can be seen in Example B, the priority level can be seen next to the Description, as well as the due date and how many employee resources are currently being used. The Deliverables section gives a quick overview of the status of a particular project.

EXAMPLE C

ABC Financial Institution—20% Market Share in Garfield County with 40% Household Profitability!

-continued

Mark Haines-CFO

| Function/Department Projects: Finance | | | Authority Matrix | |
|---|---|---|---|---|
| new project | | | Level Authorities: Senior Vice President | |
| new deliverable | | | | |
| new task | | | Budget and Contracting | |
| | | | Human Resources | |
| 1. Develop ALCO matrix | | 10/01/2001 | Policies and Procedures | |
| | sdfsadf | 03/01/2001 | | |
| | date 2 | 04/01/2001 | | |
| | date 1 | 05/01/2001 | | |
| 2. New Finance application installed | | | | |

Example C shows the third level of the organization, the Individual Connection™. This level provides a clear focus of the resources controlled by an individual. It links individual results to organizational outcomes. Each individual can understand how he contributes to the success of the organization. This level is used as a guide for prioritizing the allocation of resources, recognizing performance, coaching, and updating targeted outcomes throughout the term. The individual's section is dissected into modules or tasks just like for the team and organization. The Basic Role links the individual's task with the team project and the focus and strategies of the organization. The Basic Role, in this embodiment, is made up of multiple key result areas, many of which will link back to the organization's critical measures.

The specific indicators for each basic role area will either be quantitative or qualitative. The tasks to be performed will be broken down by the percentage workload for that individual, so that individual can quickly assess what needs to be done and when.

The individual employee can now understand the organizational goals and how his task relates to the team project as well as the organizational goals. The employees can now understand their tasks better and how they relate to the organizational objectives without needing to make appointments to speak with supervisors or executives of the organization.

A fourth level would be a chart for each individual employee to have and manipulate. This level would be for the personal use of the individual only, so that they could leave notes for themselves or edit and prioritize their tasks or projects, as necessary.

With reference now to Examples A–C, it is to be understood that these are given as examples of this embodiment only, and are not intended to limit the invention in any manner. The inventive process could contain any number of different levels, teams, types of teams, critical measures, business priorities, and the like, as long as chosen using sound business judgment. The process can be designed to fit the needs and desires and type of business, and can be readily custom fit.

Figure 1:
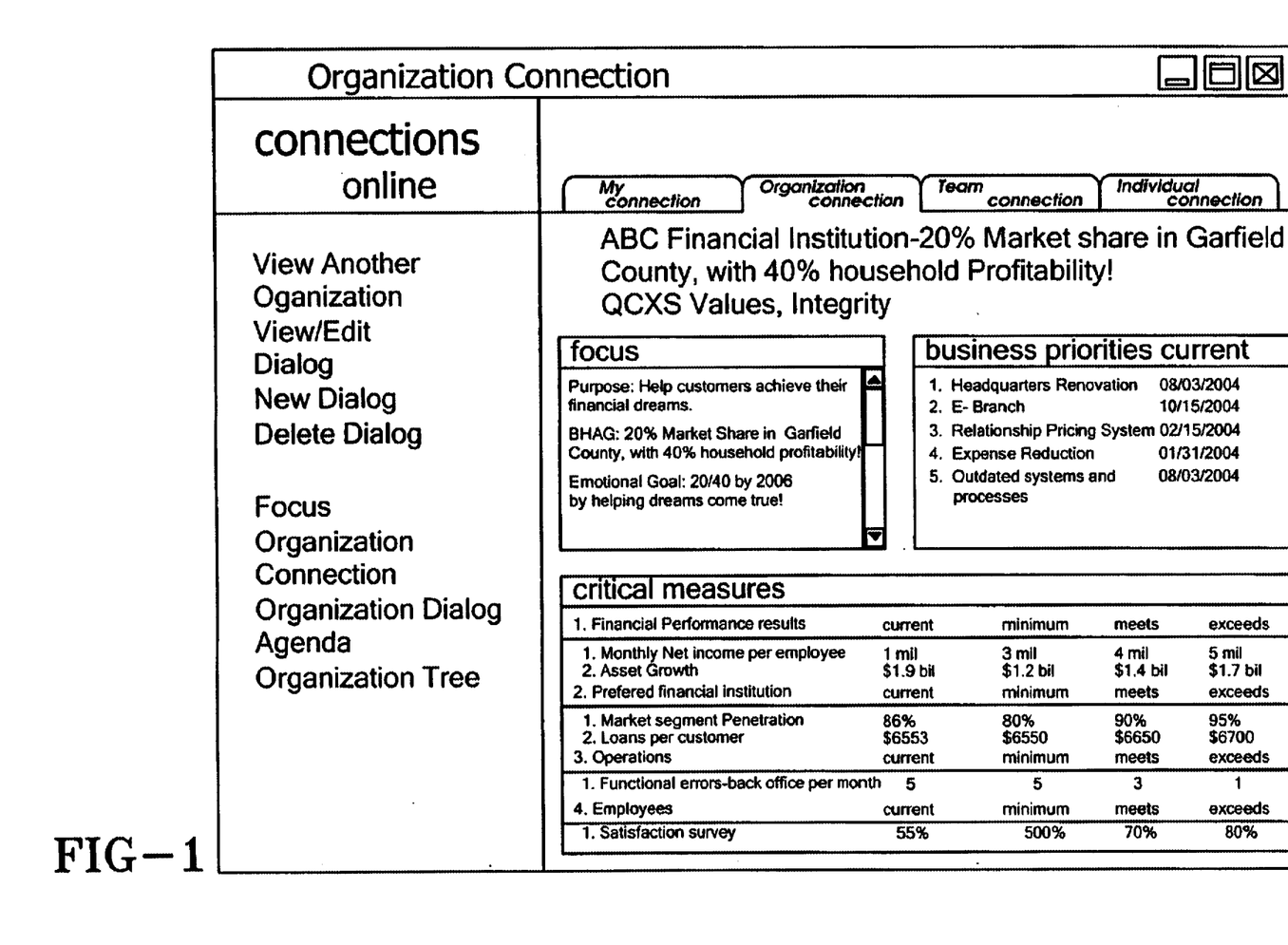
FIG. 1 is a screen shot of the organization part of the inventive process.

With continuing reference to FIGS. 1–3 and Examples A–C, the inventive process allows all levels of an organization to be aware of the broad goals and priorities of the organization, the projects on which the teams are working on, as well as what each individual is working on, and what the priority for each task is. The relational database used in the inventive process allows information to be shared throughout all levels of the organization. It is to be understood that any type of software or computer system that will allow information to be shared can be used, as long as chosen using sound business and engineering judgment.

In this embodiment, each individual in the organization has access to all of the different levels of the organization, and the information contained in the charts. Therefore, an individual employee can check the organizational chart to view the focus and business priorities, or a team leader can view the individual chart for a particular employee. With the inventive system, each member of the organization can review and evaluate all of the tasks and projects being performed by the organization relatively quickly.

Also in this embodiment, the different levels of charts are all updatable, so that an executive can view the organizational chart and decide to change one of the business priorities. When the business priority is changed, the team and individual who are working on this priority will be notified of the change so they can adjust the task or project they are working on. The team and individual charts may be changed or edited as well to reflect a new direction by the organization or to reflect a changed task or priority. In this embodiment, the changes can only be made from the top down. For example, a team leader would not be able to alter the organizational chart, and an individual would not be able to alter either the organizational or team charts. The upper management and executives would have the authority to alter any or all of the charts. It is to be understood, however, that the process can be designed to grant any level of authority to any member of the organization.

In another embodiment, the process would include security measures to restrict access to certain charts and databases. For example, the executives of the organization may not wish to have the employees viewing the organizational chart. Any security measure can be used to protect the information, as long as chosen using sound business and engineering judgment. The security measures can be at any, or all, of the different levels.

In another embodiment of this invention, the levels can include numerous other features to aid in the intercommunication between the different levels of the organization. For example, a related links section can be added so that individuals can set links and link descriptions for additional information to an address on the network or on a global computer network. The process could also include a dialog section. The dialog section could be set up to be a notation for the particular individual who enters the information, or the dialog could be shared throughout the organization. The dialog could also be associated with a particular task, priority, or project and be sent to specific individuals or teams depending on the nature of the dialog. The dialog can take any form or function chosen using sound business and engineering judgment.

The inventive process is not limited to use within one physical location, but can be accessed via a global computer network as well as an intra-company network. An individual in California can see the organizational goals of the executives in Japan. The information and data tables can be accessed and shared all over the world.

The invention has been described with reference to several embodiments. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed: What is claimed is:

1. A computer-network-aided method for interconnecting multiple sections of an organization, the organization having multiple layers, the method comprising the steps of:

creating an electronic data table, the data table containing at least one objective of the organization, at least one goal of the organization, and priority levels for the at least one objective;

providing means for analyzing the at least one objective via a computer network;

providing means for organizing the at least one objective via the computer network;

creating at least one team project based on the at least one objective via the computer network;

connecting the at least one team project to the at least one objective, via the computer network, such that when the at least one objective is altered, the at least one team project is automatically updated to reflect the alteration to the at least one objective;

assigning at least one task based on the at least one team project;

connecting the at least one task to the at least one team project, via the computer network, such that when the at least one team project is altered, the at least one task is automatically updated to reflect the alteration to the at least one team project;

assigning priority levels to the at least one objective, the at least one team project, and the at least one task;

allowing an associated employee, with access to the data table, to access and edit, via the intranet, the at least one team project; and, providing means for comparing the at least one objective, the at least one team project, and the at least one task.

2. A computer-network-aided method for organizing a business entity, the method comprising the steps of:

creating a first informational database, the first informational database containing at least one business objective of the business entity;

creating a second informational database, the second informational database containing at least one project based on the at least one business objective;

allowing open access to and between the first and second informational databases, via a global computer network;

connecting the second informational database to the first informational database, via the global computer network, such that when the at least one objective is altered, the at least one project is automatically updated to reflect the alteration to the at least one objective;

editing at least one of the informational databases via the global computer network;

determining organizational priorities;

assigning a priority value to the at least one objective via the global computer network;

assigning a priority value to the at least one project via the global computer network;

creating a third informational database;

creating at least one task based on the at least one project;

allowing open access to and between the first, second, and third informational databases, via the global computer network; and, connecting the at least one task to the at least one project, via the global computer network, such that when the at least one project is altered, the at least one task is automatically updated, via the global computer network, to reflect the alteration to the at least one project.

3. The method of claim 2, wherein the method further comprises the step of:

allowing limited access to the first and second informational databases, via the global computer network.

4. The method of claim 2, wherein the method further comprises the step of:

allowing limited access between the first, second, and third informational databases.

5. The method of claim 4, wherein the method further comprises the step of:

providing security measures, via the global computer network, for limiting access to the informational databases.

6. The method of claim 5, wherein the method further comprises the steps of:

editing at least one of the informational databases; and, updating at least one of the informational databases.

7. The method of claim 6, wherein the method further comprises the steps of:

developing critical measures associated with the first informational database;

developing evaluation criteria and deliverables for the second informational database; and, developing basic roles for the third informational database.

8. The method of claim 2, wherein the method further comprises the step of:

accessing at least one of the informational databases from a remote location.

9. A computer readable medium containing instructions for controlling a computer system to perform a method via a global computer network, the method comprising the steps of:

creating a first informational database on the global computer network, the first informational database containing at least one business objective of the business entity;

creating a second informational database on the global computer network, the second informational database containing at least one project based on the at least one business objective;

allowing open access to and between the first and second informational databases, via the global computer network;

connecting the second informational database to the first informational database, via the global computer network, such that when the at least one objective is altered, the at least one project is automatically updated to reflect the alteration to the at least one objective;

editing at least one of the informational databases, via the global computer network;

determining organizational priorities;

assigning a priority value to the at least one objective;

assigning a priority value to the at least one project;

creating a third informational database on the global computer network;

creating at least one task based on the at least one project;

allowing open access to and between the first, second, and third informational databases, via the global computer network; and, connecting the at least one task to the at least one project, via the global computer network, such that when the at least one project is altered, the at least one task is automatically updated to reflect the altercation to the at least one project.

10. The computer readable medium of claim 9, wherein the method further comprises the step of:
    allowing limited access to the first and second informational databases.

11. The computer readable medium of claim 9, wherein the method further comprises the step of:
    allowing limited access between the first, second, and third informational databases.

12. The computer readable medium of claim 11, wherein the method further comprises the step of:
    providing security measures for limiting access to the informational databases.

13. The computer readable medium of claim 12, wherein the method further comprises the steps of:
    editing at least one of the informational databases; and,
    updating at least one of the informational databases.

14. The computer readable medium of claim 13, wherein the method further comprises the steps of:
    developing critical measures associated with the first informational database;
    developing evaluation criteria and deliverables for the second informational database; and,
    developing basic roles for the third informational database.

* * * * *